G. E. KARL, J. F. KOLCZYNSKI AND C. K. WOODIN.
METHOD OF PRODUCING AGRICULTURAL IMPLEMENT WHEELS.
APPLICATION FILED MAR. 14, 1919.

1,325,723.

Patented Dec. 23, 1919.
5 SHEETS—SHEET 1.

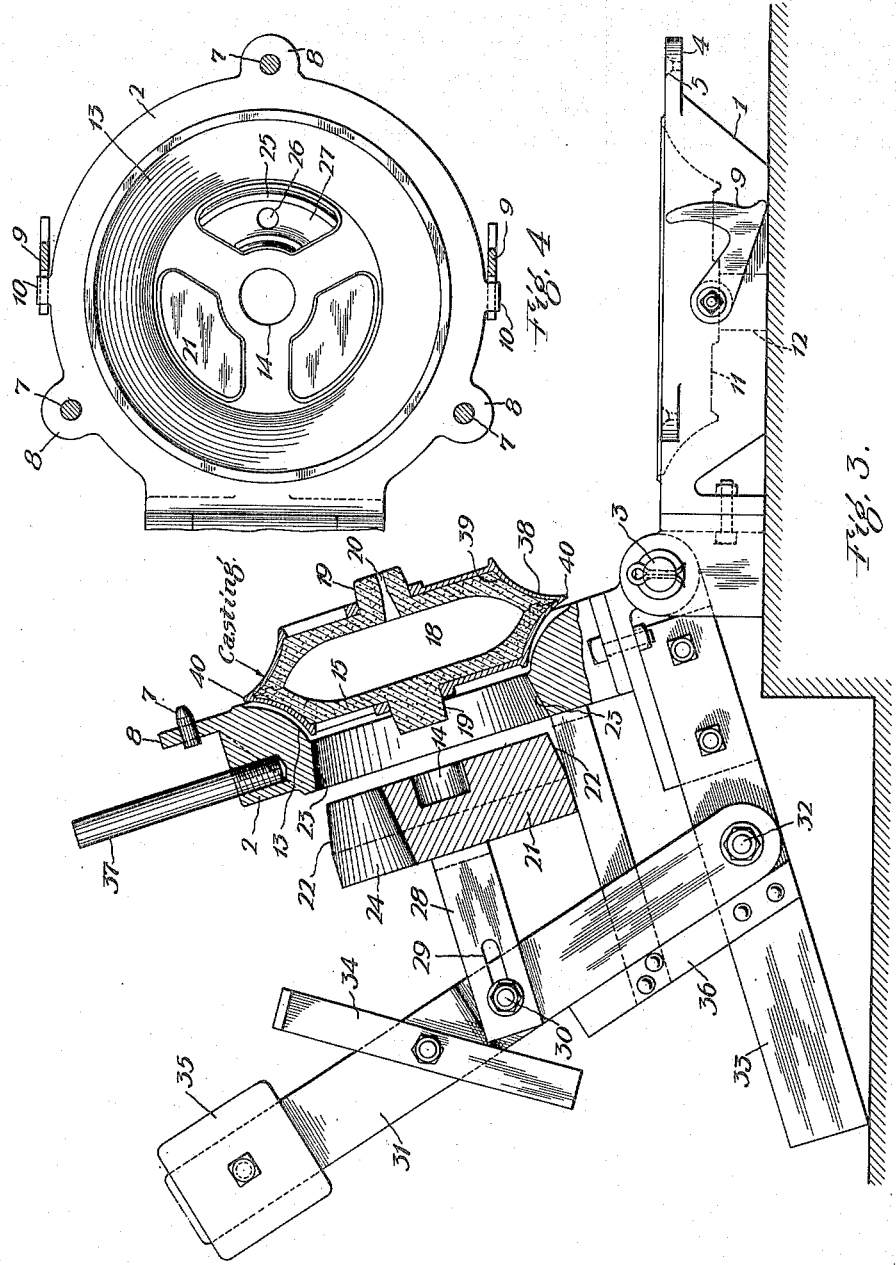

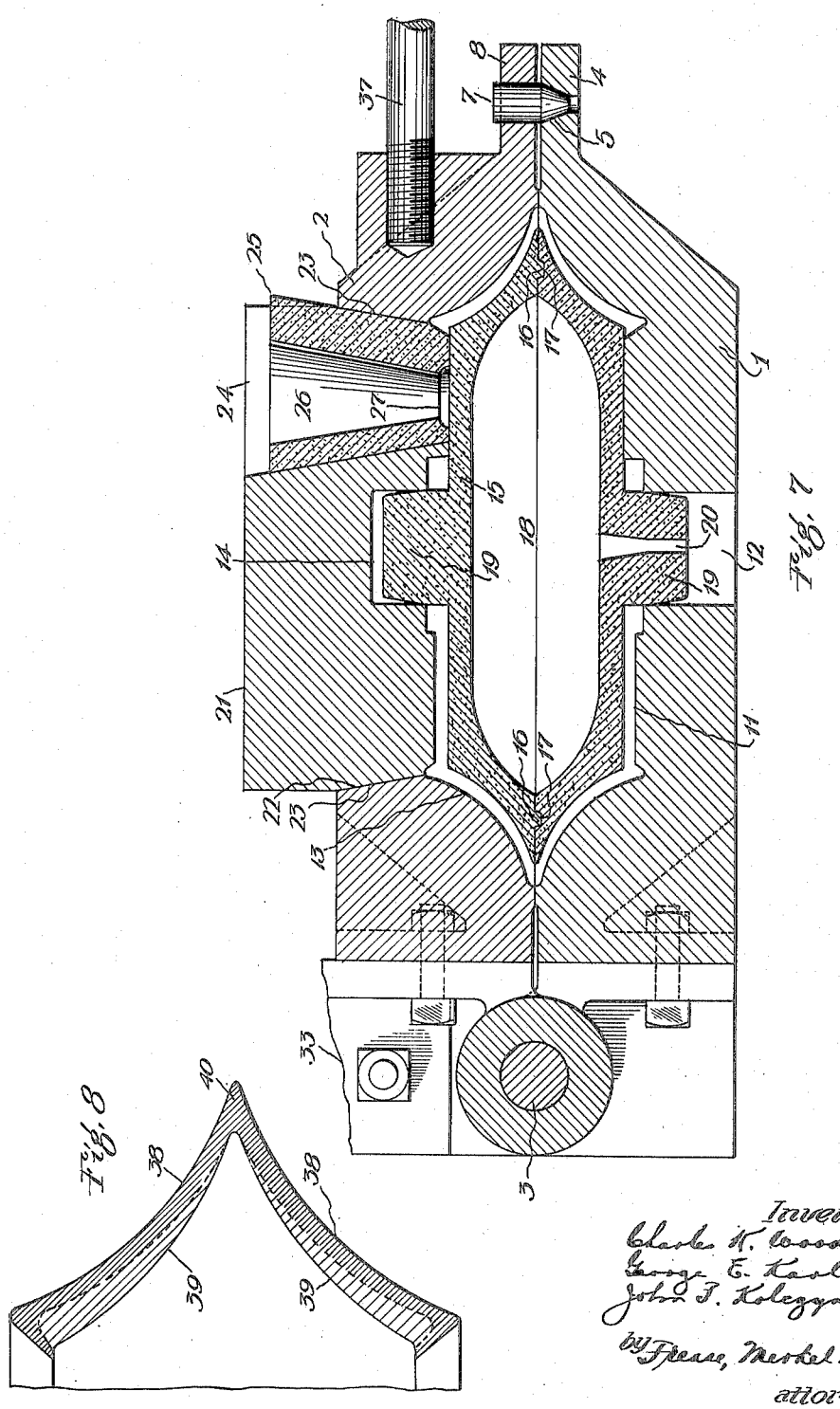

G. E. KARL, J. F. KOLCZYNSKI AND C. K. WOODIN.
METHOD OF PRODUCING AGRICULTURAL IMPLEMENT WHEELS.
APPLICATION FILED MAR. 14, 1919.
1,325,723.
Patented Dec. 23, 1919.
5 SHEETS—SHEET 5.
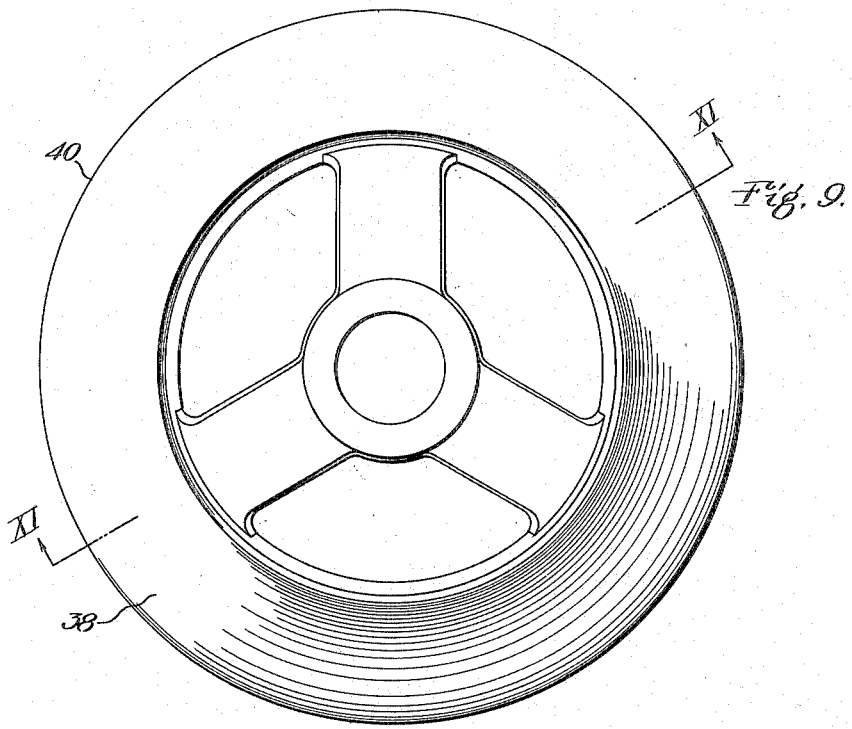
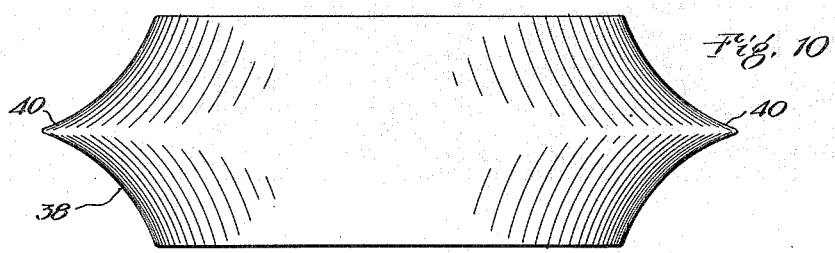
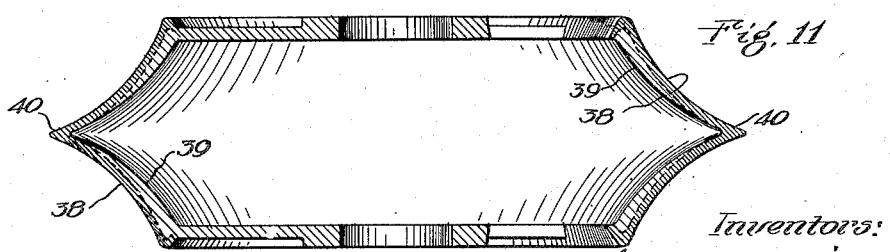

UNITED STATES PATENT OFFICE.

GEORGE E. KARL AND JOHN F. KOLCZYNSKI, OF BEREA, OHIO, AND CHARLES K. WOODIN, OF POUGHKEEPSIE, NEW YORK, ASSIGNORS TO THE DUNHAM COMPANY, OF BEREA, OHIO, A CORPORATION OF OHIO.

METHOD OF PRODUCING AGRICULTURAL-IMPLEMENT WHEELS.

1,325,723.      Specification of Letters Patent.      Patented Dec. 23, 1919.

Original application filed December 26, 1918, Serial No. 268,386. Divided and this application filed March 14, 1919. Serial No. 282,649.

*To all whom it may concern:*

Be it known that we, GEORGE E. KARL and JOHN F. KOLCZYNSKI, citizens of the United States, and residents of Berea, county of Cuyahoga, and State of Ohio, and CHARLES K. WOODIN, a citizen of the United States, and a resident of Poughkeepsie, county of Dutchess, and State of New York, have invented new and useful Improvements in Methods of Producing Agricultural-Implement Wheels, of which the following is a specification, the principle of the invention being herein explained and the best mode in which we have contemplated applying that principle, so as to distinguish it from other inventions.

Our invention relates to methods of producing agricultural implement wheels and especially hollow cast metal wheels having a rim, the outer portion of which is chilled and the inner portion of a softer nature, whereby to form a strengthening backing for the chilled portion; and more particularly in forming such wheels for use in agricultural implements adapted for pulverizing or mulching the soil.

Wheels of the above-described character when intended for agricultural purposes depend for their effectiveness upon the concentration of the weight of the machine upon hard lumps in order that such lumps may be cut, broken and cracked so that the further action of the wheels in rolling over the pieces may properly pulverize them. Furthermore, we have found that such effectiveness is enhanced by providing the wheel with a sharp cutting edge and with a hard exterior smooth surface that will resist a tendency of the moist earth to stick thereto.

Heretofore agricultural wheels have been cast of ordinary gray iron but it was found that the desired sharpness of the edge of the above-mentioned annular apex portion could not be retained, by reason of the character of the gray iron which, as is well known, is comparatively soft and quickly wears out. Furthermore, in the casting operation it was found impractical to provide an initially sharp edge for the reason that these wheels have always been cast in sand molds and, as is well known, a well defined, sharp, thin structure is difficult to obtain by these means. Furthermore, these gray iron wheels have a rough exterior surface to which the moist earth adhered readily and thus impeded the ready movement of the implement over the ground, as well as interfering with the proper mulching or pulverizing of the soil. Such rough exterior surface, furthermore, required an excessive amount of paint or pigment which is usually applied thereto after the manufacturing is complete and before shipping to the user.

In addition, it has been found necessary to reduce the cost of the production of these wheels, inasmuch as a soil pulverizer includes in its structure a great number thereof and the labor in producing wheels of this character is now a limiting factor in the production of such pulverizers. Furthermore, the price at which soil pulverizers must be sold at the present time prohibits the improvement of the wheels by methods which would increase the cost.

To this end we have provided a metal mold (preferably cast iron), upon the interior of which is suitably supported, as will be hereinafter more fully explained, a porous sand core, the mold and core together forming an interior space into which the metal is poured to form the required wheel. As is well known, certain kinds of molten mixtures of iron, cast into a metal mold and coming into contact with the metal, chills to form what is known as white iron. Such chilling takes place in our improved process, but the sand core, being of markedly less heat conductivity, does not cause the iron which comes into contact with it to become chilled, with the result that we obtain a wheel, the rim portion of which in particular has its outer or superficial structure of white iron and its inner structure of gray iron. The white iron, as is well known, is of glass-like consistency and extremely brittle, having small resistance to flexure. The gray iron on the other hand is comparatively tough, and embodies those characteristics necessary to give the rim portion of the wheel the required strength.

We have found that by utilizing a certain type of mold and limiting the time in which the wheels are permitted to remain in the mold to a predetermined period, we have been able to control the amount of chilling action which takes place so as to provide these comparatively thin structures with the required exterior white iron structure and the interior gray iron structure, thus enabling us to utilize the advantageous characteristics of such white iron exterior surface, to obtain the required sharp apex portion of the wheel and to produce the entire wheel at a comparatively low cost, while having the necessary characteristics of strength.

Reference is had to our copending application, Serial No. 268,386, filed December 26, 1918, which discloses and claims the wheel constituting a part of our invention, and to our copending application Serial No. 277,078, filed February 14, 1919, for the apparatus for making the same.

Among the objects of our present invention, therefore, is the provision of a method of forming hollow cast metal wheels having a rim portion, the outer face of which is chilled and the inner portion of which rim is unchilled and of a softer nature to act as a strengthening backing for the chilled face; to provide a method of accomplishing the maximum output of such wheels with a minimum expenditure of time, labor and expense; to make possible the manufacture of such hollow cast metal wheels of maximum simplicity and efficiency; to make possible the production of a wheel for agricultural purposes having a chilled outer face with a sharp cutting edge and light in weight without sacrificing its strength; further to provide a method which can be readily and quickly applied whereby to control the depth of chill and insure a good casting; and such further objects, advantages and capabilities as will later more fully appear.

The annexed drawings and the following description set forth in detail certain means for carrying out the invention, the disclosed means, however, constituting but one of various mechanical forms in which the principle of our invention may be applied.

In said annexed drawings:

Fig. 3 represents the mold when open and showing a casting therein just prior to its removal, the cope of the mold being shown in axial section.

Fig. 4 represents a bottom plan of the cope of the mold taken upon the plane indicated by line IV—IV, in Fig. 1 and viewed as indicated by the upwardly extending arrows.

Fig. 7 represents an axial section, upon an enlarged scale, of the drag and cope of the mold closed and showing the position which it occupies just prior to the casting operation.

Fig. 8 represents upon an enlarged scale a fragmentary axial section of one of the resultant pulverized wheels, such section being specifically designed to illustrate the structure of the rim portion thereof.

Fig. 9 represents a side elevation of a complete wheel, and Fig. 10 a front elevation thereof.

Fig. 11 represents an axial section of a completed wheel.

Figure 1:
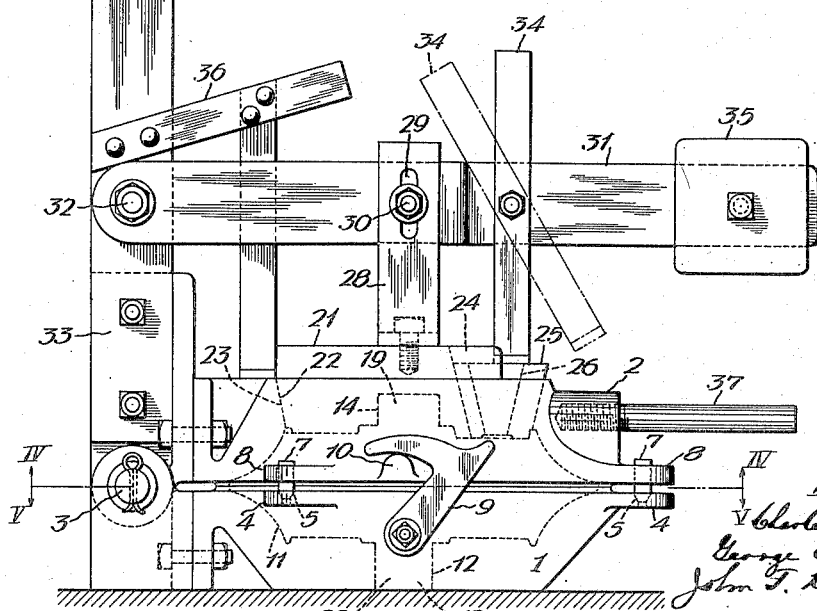
Figure 1 represents a side elevation of a mold utilized in carrying out our present invention.
Figure 5:
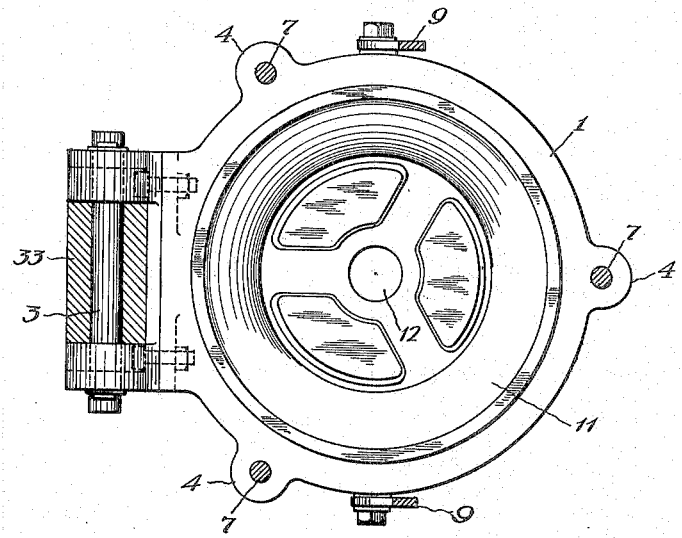
Fig. 5 represents a top plan of the drag of the mold upon the plane indicated by line V—V, Fig. 1, and as indicated by the downwardly extending arrows.

The illustrated form of mold comprises a cast iron drag 1 and a cast iron cope 2 which are pivotally connected by means of a pin 3, Fig. 1. The outer end of the drag is provided with a lug 4 having a conical recess 5 which receives the conical lower end of a pin 7 fixed to a lug 8 projecting from the front of the outer swinging end of the cope. The function of this pin and recess is to permit the proper registration of the cope and drag and their retention in a fixed position laterally during the casting operation, as will be readily understood.

Pivoted upon opposite sides, respectively, of the drag are two latches 9 which are adapted to engage a lug 10 whereby the cope and drag may be locked together.

The drag is formed with the inner central recess 11, the middle portion 12 of which extends downwardly and pierces the lower surface of the drag. This recess 11 determines the exterior surface of one half of the required wheel. The complementary recess 13 in the cope determines the outer surface of the other half of the wheel and an upwardly extending cylindrical and centrally located recess 14 is provided. The form of the recesses 11 and 13 is such as will produce an outer surface of a wheel such as illustrated in Figs. 9 to 11, inclusive.

For the purpose of determining the inner surface of the wheel, a two-part sand core 15, Fig. 7, is provided, the two parts being respectively provided with dowels 16 and recesses 17 in order to provide for their proper registration. The two parts of the core are hollowed so that when they are joined they form an interior gas receiving recess or chamber 18. The central part of each of the core parts is provided with a cylindrical boss 19, the lower part being further provided with a gas duct 20. These bosses are made slightly tapered, as shown, and are adapted to fit in the recesses 12 and 14, whereby the core is centered. The diameters of these bosses 19 are such that they will cause the core to assume a position in which its outer surfaces are removed from the inner surface of the mold, as shown in said Fig. 7 and these inner surfaces are so designed that they will produce a rim portion of the wheel which is of maximum thickness at the lateral portions thereof and of minimum thickness near the central or apex portion of such wheel, as illustrated in Fig. 8, and as will be understood, suitable grooves are provided in the drag and cope for the formation of the spokes of the wheel.

Figure 6:
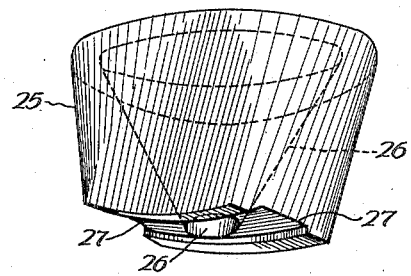
Fig. 6 represents a perspective of the sprue core.

The cope comprises in its structure an upwardly displaceable steel member or insert 21, which is generally cylindrical in form and whose lower portion is tapered as at 22. This tapered portion fits into a tapered conical aperture 23 and the lower surface of the member 21 determines the upper surface of the casting and contains the cylindrical recess 14. One side of the member 21 is provided with a tapered recess 24 which receives the sprue core 25 having the tapered opening 26 and also lateral ducts 27 extending both ways from the tapered opening 26, as shown in Fig. 6.

To the upper end of the member 21 is secured an upright 28 having an elongated slot 29, through which extends a bolt 30. This bolt passes through and is secured to a lever 31 pivoted at 32 to an upright 33 fixed to and forming a part of the frame and mold. The bolt 30 is so arranged that it extends loosely through the slot 30 so that the member 21 may move upwardly.

Figure 2:
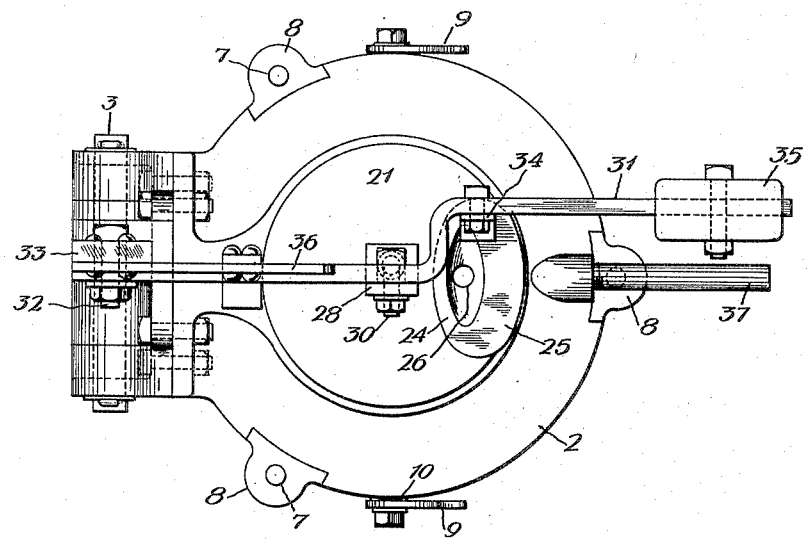
Fig. 2 represents a top plan of such mold.

Pivotally mounted upon the lever 31 is a latch 34 which is adapted to swing free and engage the sprue core 25, whereby the latter is held in position during the pouring operation. This lever 31 is furthermore offset, as shown in Fig. 2, so as to avoid being in a position directly above the sprue core, thus allowing ready access to the latter. A weight is secured to the outer end of the lever 31 which provides sufficient resistance to the displacement of the sprue core 35 when the latch 34 is in its locking position.

Secured to the standard or upright 33 and adjacent to the pivot 32 is a stop 36 inclined upwardly, as shown. Fixed to the front of the cope 2 is a horizontally extending bar 37 to which may be applied a pipe for the purpose of forming a lever or handle adapted to lift the cope, as will be hereinafter described.

The mold being in the position shown in Fig. 1, it is ready for the casting operation. Any suitable mixture that will produce, when chilled, a white iron, may be used. We have found that one mixture for this purpose comprises iron having 2.5% of silicon, .10% sulfur, .30% to .50% of phosphorus and .50% to .80% of manganese. These proportions may, of course, be varied, the amount of chill to be obtained being primarily determined by the proportion of silicon and manganese used.

This molten mixture is now poured into the mold through the sprue core and flows rapidly around in both direction and fills the space between the mold and the core. As soon as the mold is filled, the pipe is applied to the bar 37, the latches 9 are disengaged from the lugs 10 and the cope is lifted upwardly and swung over into the position shown in Fig. 3. This action automatically disengages the stop 34 from the sprue core and the momentum of the weight 35 carries the lever 31 backwardly until it strikes the stop 36. This action disengages the displaceable cope member 21 and removes it from the recess 23, as shown in said figure. The sprue core is now knocked off, after which it will be seen that the casting is free to be removed from the mold. This is done quickly.

This described operation results in the arrest of the chill which takes place as soon as the molten metal strikes the cold interior surface of the iron mold and a rim portion structure is obtained such as is illustrated in Fig. 8, in which the outer portion 38 of the metal is chilled and the inner portion 39 consists of gray iron.

It will be observed from this figure that the cross-section of this rim portion consists of two similar legs angularly related and having outer and inner outwardly converging surfaces forming an apex portion 40. These legs, as a result of the previously described design of mold and core, are of a minimum thickness near the apex portion and of a maximum thickness at the lateral portion of these legs. As a result of this form of section, the apex portion and the leg portions of minimum thickness become substantially chilled throughout their entire structure and this chilled zone decreases in thickness laterally, as shown, until it reaches a minimum near the extreme lateral portions of the legs. Conversely, the gray iron portion 39 increases in thickness laterally. As a result the gray iron is distributed in the most advantageous manner, inasmuch as the thickest portion of such gray iron is located at that part of the structure which is subjected to the greatest amount of flexural stress. In addition a smooth exterior surface is obtained and a sharp point at the apex portion, all of which, as was previously described, is desirable and contributes to the economical operation and functioning of the wheel.

While we have illustrated and described our apparatus in connection with the manufacture of wheels adapted for use in agricultural implements, it is of course, obvious that other shapes and styles of wheels for other purposes may be made without departing from the spirit of our invention.

Having now described our invention, what we claim is:

1. The method of forming hollow cast wheels, which consists in placing in a permanent metal mold of the desired shape a core of markedly less heat conductivity than said mold, and then pouring molten metal in the space between said core and mold whereby the molten metal contacting the metal mold will be chilled and the portion contacting the core will remain unchilled to form a strengthening backing for the chilled portion.

2. The method of forming hollow cast wheels having a comparatively thin rim portion, which consists in providing a metal surface for forming the exterior of the rim, and a sand core for forming the interior of the rim, and pouring molten metal between said metal surface and said sand core to produce a chilled outer face having a softer strengthening backing.

3. The method of forming hollow cast wheels, which consists in placing in a permanent metal mold of the desired shape a core of markedly less heat conductivity than said mold, then pouring molten metal in the space between said core and mold whereby the molten metal contacting the metal mold will be chilled and the portion contacting the core will remain unchilled to form a strengthening backing for the chilled portion, and then quickly removing the wheel from the mold to control the depth of chill.

4. The method of forming hollow cast metal wheels, which consists in providing a two-part permanent mold of metal, in placing within the lower part a core of markedly less heat conductivity than the mold and of a size to produce a comparatively thin space between the exterior core surface and the interior mold surface to form the wheel rim, placing the top part of the mold on the lower part, and then pouring molten metal into the mold around the core, whereby the molten metal contacting the interior of the metal mold will be converted into white iron by chilling and that contacting the exterior of the core will remain in a gray iron state to strengthen the chilled portion.

5. The method of manufacturing a cast wheel, which consists in providing a mold having interior surfaces adapted to chill the molten metal coming into contact therewith, supplying a core having markedly less heat conductivity than said mold; pouring the molten metal into said molds and around said core, then permitting the resultant chilling action to form white iron upon the outer surface of the rim portion of the wheels in varying depth, and finally removing the casting from the mold when the required depth of chill has been obtained.

6. The method of manufacturing a cast iron wheel, which consists in providing a mold having interior surfaces adapted to chill the molten metal coming into contact therewith, supplying a core having markedly less heat conductivity than said mold, said mold and core being so arranged that they define a space for forming the rim portion of the wheel having a maximum thickness laterally and a minimum thickness at the middle of such rim portion, pouring the molten iron into said mold and around said core, then permitting the resultant chilling action to form white iron to a predetermined depth, and finally removing the casting from the mold when such depth of white iron has been formed.

7. The method of manufacturing a cast iron wheel, which consists in pouring molten cast iron into a metal mold provided with a core having markedly less heat conductivity then said mold, while the latter is in a position in which its axis is perpendicular, said mold having an upper portion capable of upward displacement, allowing the molten iron to expand against the weight of said displaceable portion, allowing the mold to chill the iron to a predetermined depth and then removing the casting from the mold so as to arrest further chilling action.

8. The method of manufacturing hollow cast iron wheels, which consists in providing a two-part permanent mold of material adapted to chill the molten metal contacting therewith, placing within said mold a core having markedly less heat conductivity and of a size to form a comparatively narrow space between the core and the mold, clamping said two parts together, pouring molten metal in said mold, quickly releasing the clamping means to permit said two parts to move slightly apart and when the molten iron has sufficiently set quickly removing the casting from the mold to control the depth of chill of the outer portion of the rim and maintain the inner portion of gray iron.

Signed by us, this 7th day of March, 1919.
GEO. E. KARL.
JOHN F. KOLCZYNSKI.

Signed by me this first day of March, 1919.
CHARLES K. WOODIN.